UNITED STATES PATENT OFFICE.

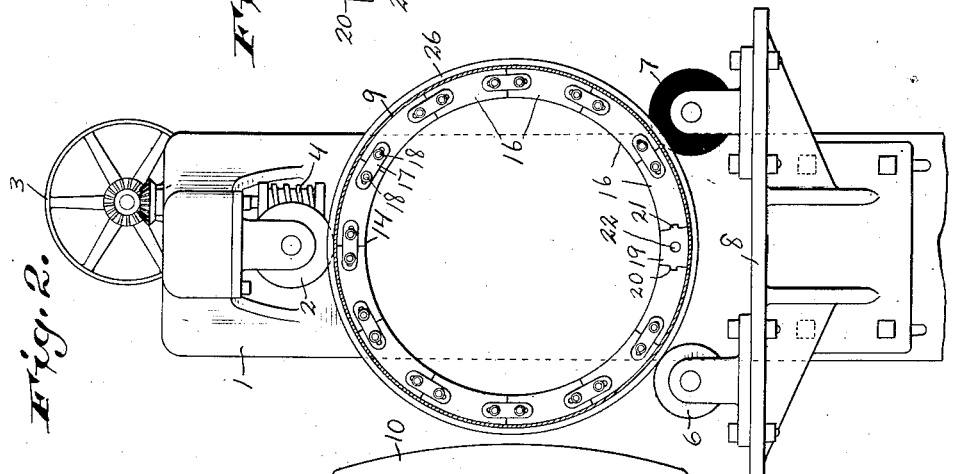
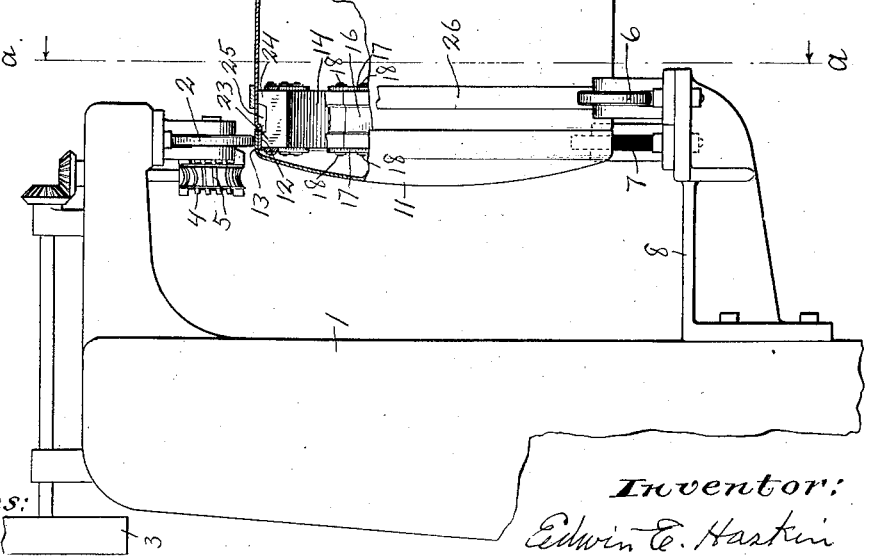

EDWIN E. HASKIN, OF NEW YORK, N. Y., ASSIGNOR OF ONE-HALF TO WALTER E. HASKIN, OF NEW YORK, N. Y.

ELECTRIC WELDING APPARATUS.

1,096,506.     Specification of Letters Patent.     Patented May 12, 1914.

Application filed September 20, 1913. Serial No. 790,849.

*To all whom it may concern:*

Be it known that I, EDWIN E. HASKIN, a citizen of the United States, residing at New York city, in the county of New York and State of New York, have invented certain new and useful Improvements in Electric Welding Apparatus, of which the following is a specification, reference being had to the accompanying drawing, forming a part thereof.

This invention relates to electrical welding apparatus and mechanism and the objects of the invention are to provide apparatus and mechanism especially adapted for welding heads or ends on tanks, kegs, barrels, tubes and similar structures when the other end of the structure is closed, though it is to be understood that the invention is not limited to such use but, on the contrary, is adapted to a great variety of uses as will be apparent to those skilled in the electric welding art.

Referring to the drawings which accompany this specification and form a part hereof, on which drawings the same reference characters are used to designate the same elements wherever they may appear in each of the several views, and which drawings illustrate an embodiment of this invention, Figure 1 is an elevation in side view of electric welding apparatus and mechanism, parts being broken away; Fig. 2 is an elevation in front view with a part shown in section, the section being taken on the line $a$—$a$ on Fig. 1 looking in the direction indicated by the arrows; Fig. 3 is a side elevation of the mandrel; and Fig. 4 is a plan view of the wedge.

The drawings illustrate what is now considered to be the best and preferred form of apparatus and mechanism embodying this invention but it will be apparent that mechanical changes can be made without departing from this invention.

Referring specifically to the drawings, the reference numeral 1 designates an electrical welding machine of any suitable type of construction. The machine illustrated, except as hereinafter claimed, forms no part of this invention and is illustrated only for the purpose of making the description of the invention clear and more readily understood. The roller 2 is a pressure and current carrying roller and is revolved by the belt pulley 3, worm 4 and worm-wheel 5 in an ordinary manner. The roller 6 is also a current carrying roller and rollers 2 and 6 are insulated from the machine standard and connected with the source of current supply (not shown) in any ordinary or preferred manner. The roller 7 is not a current carrying roller but only a steadying roller for the tank or other structure to be welded and preferably it is made from some suitable insulating material. Rollers 6 and 7 are adjustable toward or away from each other on bracket 8 and bracket 8 is adjustable up or down on the upright of the machine to provide for welding structures of different diameters.

The reference numeral 9 designates a tank with a closed end 10 and the job to be performed is to weld the head 11 on the open end of the tank. Preferably the open end of the tank is offset at 12 and the head 11 is provided with a flange 13 which overlaps the offset.

A mandrel 14 is placed inside the tank to sustain the welding pressure of roller 2 and to serve as a conductor for the current in the manner to be presently described. In order to get this mandrel out of the tank after the head 11 has been welded on, the mandrel must be of some suitable collapsing type so that it can be removed through the hand-hole provided in the tank. The mandrel illustrated is composed of segment blocks 16, loosely connected by links 17 and pins 18. The free ends of the two end segments are formed wedge-shaped and provided with recesses to engage with the wedge 19 and the feathers 20 and 21 thereon so that the mandrel can be expanded into tight contact with the inside of the tank or other structure to be welded. The wedge 19 may have a screwthreaded hole 22 to receive a screwthreaded rod (not shown) for removing the wedge to permit the removal of the mandrel.

The construction of the mandrel is one of the most important parts of this invention. The mandrel is formed with an anvil and conducting part 23 and a separate contact part 24 spaced from the anvil part but in good electrical communication therewith. The contact part 24 of the mandrel is designed to make good electrical contact with the interior of the tank or other structure being welded. The simplest and preferred method of providing the mandrel with the anvil part 23 and the contact part 24 is to provide the exterior of the mandrel with the groove 25. In the construction of the mandrel illustrated by the drawings the groove 25 extends around the entire mandrel being cut into each segment block and the wedge. This groove may be cut or molded or formed in any other suitable manner. In the construction illustrated by the drawings where the tank being welded is provided with the offset 12, the anvil part 23 of the mandrel is lower than the contact part 24 of the mandrel by the thickness of the offset.

The reference numeral 26 designates a copper strap which may be temporarily secured about the tank or other structure being welded over the contact part 24 of the mandrel to serve as a trackway for the contact roller 6 to make better contact than as would exist if roller 6 contacted directly and only with the tank.

The use and operation of the apparatus is as follows: The tank, or other structure to be welded, the head 11, mandrel and copper strip 26 are assembled as shown and in the relation to the current carrying rollers as shown. Current is supplied to the current carrying rollers and the current raises the offset part 12 and the flange 13 to the welding temperature. The pressure of roller 2 on the anvil part 23 of the mandrel makes the weld and the tank being rotated the weld is made continuous around the circumference of the tank. When the weld is completed the wedge 19 and the mandrel are removed through the hand-hole 15. The path for the welding current is through the current carrying rollers 2 and 6, the mandrel and into and out of the tank through the part to be heated and welded and through a part of the tank which it is not desired to heat. The copper strap 26 assists in preventing the heating of the tank in proximity to roller 6 by providing a large conducting area of good conductivity between the roller 6 and the metal of the tank.

What is claimed is:

1. A mandrel for electric welding having an anvil and conducting part and a separate contact part spaced from the anvil part but in good electrical communication therewith.

2. A mandrel for electric welding composed of segments joined together and provided with an anvil and conducting part and a separate contact part spaced from the anvil part but in good electrical communication therewith.

3. The combination with a mandrel having an anvil and conducting part and a separate contact part spaced from the anvil part but in good electrical communication therewith, of current carrying members adapted to be placed in electrical communication with the anvil and contact parts of the mandrel respectively through the structure to be welded.

In witness whereof I hereto affix my signature in presence of two witnesses.

EDWIN E. HASKIN.

Witnesses:
FRANK E. DENNETT,
FRED PALM.